Nov. 8, 1960  A. C. ELD ET AL  2,959,404
VAPOR-LIQUID CONTACTING APPARATUS
Filed Dec. 31, 1956
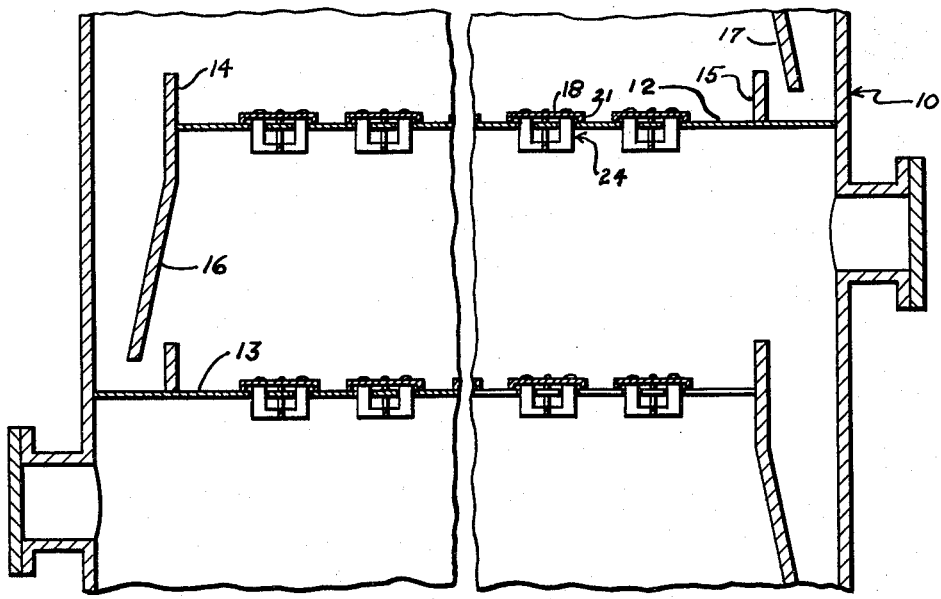
Fig. 1
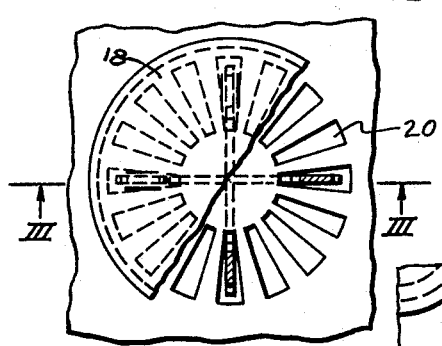
Fig. 2
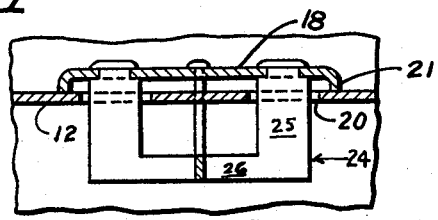
Fig. 3
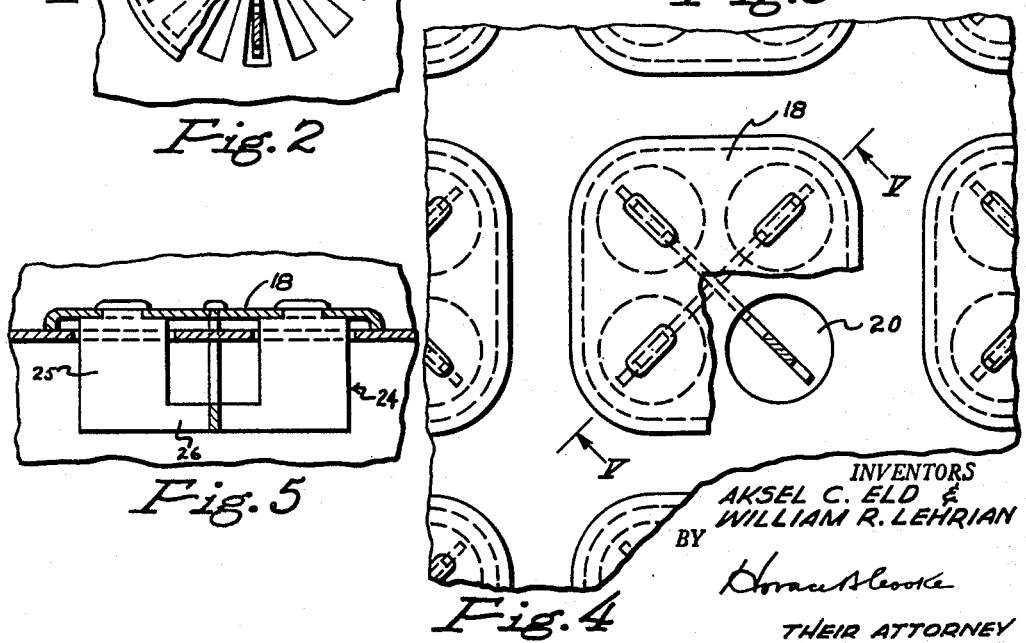
Fig. 5
Fig. 4
INVENTORS
AKSEL C. ELD &
WILLIAM R. LEHRIAN
BY Horace A. Cooke
THEIR ATTORNEY 2,959,404

VAPOR-LIQUID CONTACTING APPARATUS

Aksel C. Eld, Pittsburgh, and William R. Lehrian, Verona, Pa., assignors to Gulf Oil Corporation, Pittsburgh, Pa., a corporation of Pennsylvania Filed Dec. 31, 1956, Ser. No. 631,782

1 Claim. (Cl. 261—114)

This invention relates to improvements in trays for vapor-liquid contacting towers and more particularly to an improved bubble cap structure for such trays.

Bubble tray towers have great importance in vapor-liquid contacting procedures such as fractional distillation of fluid mixtures, absorption of gases in liquids, and stripping of volatile components from liquids. The tower is used for bringing a stream of vapor and a stream of liquid into intimate countercurrent contact.

Bubble tray towers are provided with a series of horizontal trays, usually equally spaced apart in the vertical tower. In the normal operation liquid flows downwardly from tray to tray and flows horizontally across each tray, a liquid level being maintained on each tray by overflow weirs. Vapor rises through openings or vapor passages in each tray and is intimately mixed with the liquid flowing across the tray. In the conventional bubble cap tray, a tubular chimney surrounds each opening or vapor passage and a stationary bell-shaped cap surmounts each chimney. The vapor rises from below the tray through the chimney, is diverted downwardly by the cap and bubbles out under the edges of the cap.

When the ratio of liquid to vapor is not excessive the conventional style bubble caps function reasonably well. However, in some operations they have serious disadvantages. For example, when the liquid flow greatly exceeds the vapor flow, as may occur in high pressure fractionation of hydrocarbon mixtures, there is a serious danger of "liquid dumping" which is the flow of liquid under the bubble caps and down the column through the vapor chimneys. When this occurs proper vapor-liquid contact is not obtained.

Bubble trays have been designed with the specific purpose of avoiding liquid dumping. One such tray employs a floating plate cap over each hole in the tray. The periphery of the cap rests on the tray floor and forms a liquid seal. This type of cap is simply a freely floating disk, loosely enclosed within an overhead framework that limits its upward movement. For any particular cap, when the vapor velocity is sufficiently high the cap is raised from the tray floor and vapor can bubble through the liquid on the tray. When the vapor velocity is low, the cap remains seated on the tray floor covering the hole in the tray and sealing against the flow of liquid downwardly through the vapor passage.

The conventional floating plate cap type of bubble tray has to some extent reduced the problem of liquid dumping in fractionating towers. However, it has not been entirely successful in this respect and, furthermore, has other disadvantages. In the conventional structure each hole or vapor passage in the tray is covered by a single floating cap, the cap being only slightly larger in area than the hole. When the cap is lifted all of the vapor flowing from under the cap flows through the one large hole. Consequently there is a tendency to form large bubbles. Furthermore, the cap is easily tiltable and all of the vapor may escape under one side of the tilted cap. As a result of the large bubbles and the poor distribution of bubbles about the rim of the cap, intimate contacting of all portions of the vapor and liquid is not obtained.

The conventional floating plate cap has another disadvantage. As we have said, this type of cap is enclosed by an overhead framework. Each tray has a large number of these frameworks extending upwardly from its surface and they provide a substantial resistance to liquid flow across the tray. Because of the flow resistance there is a substantial difference in liquid level or head across the tray, the liquid level being much higher on the inlet side of the tray than on the outlet side. A marked difference in liquid head across the tray is undesirable because, unless other steps are taken to prevent it, the vapor will rise more readily on the side of the tray with low liquid level and the entire tray surface will not be used efficiently.

Our present invention resides in an improved bubble tray structure which avoids or reduces the problems of liquid dumping encountered with the conventional bell cap and chimney bubble trays, and the problems of poor liquid-vapor contact and excessive resistance to liquid flow that are encountered with the conventional floating plate cap type of tray. In general, the bubble trays of our invention comprise a substantially horizontal tray having a plurality of upwardly movable or vertically displaceable caps. Each cap is mounted over a plurality of openings or vapor passages in the tray floor. When no vapor flows through the openings the rim of the cap rests on the tray floor surrounding the plurality of openings and forms a seal against the flow of liquid into the openings. Each cap is provided with means extending below the tray which limits the lateral and vertical displacement of the cap.

We will describe our invention in more detail by referring to the drawings of which:

Figure 1 is a schematic sectional view of a portion of a fractionating column provided with trays of our invention;

Figure 2 is a plan view, partly broken away, of one modification of our bubble cap assembly;

Figure 3 is a sectional view of the bubble cap assembly along line III—III of Figure 2;

Figure 4 is a plan view, partly broken away, of a portion of a fractionating tray provided with another modification of our bubble cap; and Figure 5 is a sectional elevation along line V—V of Figure 4.

In Figure 1 a portion of the fractionating tower 10 is shown in section. The vertical tower is provided with a series of horizontal trays such as tray 12 which are spaced apart substantially uniformly throughout the tower. Tray 12 is provided with an outlet weir 14 extending across one side of the tray and an inlet weir 15 extending across the other side, although an inlet weir is not in all cases essential for maintaining a liquid level on the tray. On the outlet side of the tray a downflow apron 16 extends below the tray and outlet weir 14. The apron 16 and the wall of column 10 form a passage for the flow of liquid to the tray below. Similarly, liquid flows from the tray above tray 12 through the passage formed by apron 17 and the wall of the fractionating column. This liquid flows over the weir 15, across tray 12 and over the weir 14. Thus, a level of flowing liquid is maintained across tray 12 above the bubble caps.

Tray 12 has a plurality of floating plate caps 18 arranged in rows on the tray floor. Each of these caps is mounted over a plurality of openings or vapor passages 20 in the tray floor. The cap 18 is substantially disc-shaped but has a down-turned circular rim 21. The rim 21 rests flat on the surface of tray 12 when vapor is not passing upwardly through openings 20 and entirely surrounds all openings covered by the cap. The rim of the cap thus forms a seal against the flow of liquid into the openings 20.

Each of the caps 18 is provided with a retaining spider 24 which serves as a means for limiting the vertical and horizontal movement of the cap and for stabilizing the cap against tilting. Substantially, the entire structure of the spider 24 is positioned below cap 18 and, as a result, the spider gives the least possible resistance to the flow of liquid across the top of tray 12. In the modification of the drawing the retaining spider consists of two U-shaped members joined at their lower ends in right angled relationship. The vertical legs 25 of these U-shaped members pass through openings 20 of the tray and are attached at their upper ends to the under surface of cap 18. The spider can be attached to the cap in any suitable manner, for example, by welds or by peened lugs which extend through the top of the cap, as shown in the drawing. The lateral arms 26 at the lower ends of the vertical legs 25 serve as means for limiting the vertical displacement of cap 18. The lateral arms 26 are spaced a substantial distance below the under surface of tray 12 when the rim of cap 18 rests on the tray floor. The cap and retaining spider are free to move vertically a distance equal to the distance between the bottom of the tray floor and the lateral arms of the spider.

We will describe the functioning of our bubble cap trays in fractional distillation of fluid mixtures by reference to one particular tray and bubble cap assembly shown in the drawing. As we have indicated, liquid flows downwardly from the tray above tray 12 and over the inlet weir 15. A liquid level is formed between the weirs 14 and 15. Liquid moves horizontally across tray 12, flowing over weir 14 and then down to the next lower tray 13. Vapors formed on tray 13 rise upwardly through the holes in tray 12. If the vapor velocity is sufficiently high, cap 18 is lifted from its position of rest on tray 12. The vapor passes through the openings under cap 18, then under the rim 21 of cap 18 and bubbles upwardly through the liquid which flows across tray 12. Since the tray floor is provided with a plurality of openings 20 under cap 18 the vapor flowing upwardly under the cap is divided into small portions flowing through the different openings. As a result, the vapor passes under the rim of cap 18 in small bubbles in reasonably uniform distribution around the rim.

If the vapor velocity below tray 12 is not sufficient to force vapor upwardly through the openings in the tray, cap 18 remains seated on the floor of the tray. The periphery or rim 21 resting flat against the tray floor forms a liquid seal and prevents liquid from flowing under the cap and into the openings 20. Consequently, liquid dumping does not occur. Intimate vapor-liquid contacting is favored by the fact that a plurality of vapor passages is provided under each cap of our bubble tray to divide the stream of vapor into small portions and promote the formation of small bubbles of vapor. This is further favored by the fact that cap 18, when it rises, is kept substantially horizontal by the weight of the depending spider. The hanging spider serves as a means to stabilize the cap against tilting. Because of this hanging weight which gives the cap a low center of gravity, the cap cannot easily be tilted to release large bubbles of vapor or permit the leakage of liquid under the tilted rim of the cap.

Within the scope of the invention modifications can be made in the structure shown in the drawing. For example, in the drawing we have shown two modifications of our apparatus with respect to the shape and number of openings covered by the vertically displaceable cap. Figures 2 and 3 show an advantageous form of the apparatus in which the cap covers a large number of uniformly spaced, small radial slots in the tray floor.

Figures 4 and 5 show another modification in which the cap covers four circular openings. The latter modification has the advantage of ease of fabrication but is somewhat less satisfactory in accomplishing the formation of small bubbles of vapor uniformly distributed around the cap. However, the modification of Figures 4 and 5 is still markedly superior to the conventional floating plate cap tray in which the cap covers a single large opening in the tray floor.

The number of bubble cap assemblies on each tray can vary considerably. They should be arranged in rows perpendicular to the direction of flow of liquid across the tray and each tray should have at least two rows of caps. Ordinarily many more rows would be provided. For best results the rows of caps should be alternately staggered so that the liquid will not flow in channels between the rows where is may not be contacted by vapor.

Numerous variations in the structure of the retaining spiders can be made. The essential features are that they serve as means for limiting the vertical and horizontal movement of the caps and as means to prevent the caps from tilting when the caps are raised. In addition, substantially all of the spider structure should be below the cap so that it gives the least possible resistance to the flow of liquid across the tray.

The structure of spider 24 shown in the drawing is particularly well suited for providing stability for the cap 18 or, in other words, for preventing lateral movement and tilting of the cap. As the drawing shows, the spider 24 has four legs 25. These legs serve as the connecting means between the cap and the lateral members 26 which limit vertical movement of the cap. In addition, the legs, which extend through the vapor passages 20 and extend radially almost to the outer edges of the vapor passages serve as a means for guiding the cap in its vertical movement and for limiting its horizontal displacement. The spider shown in the drawing has four such legs. This structure combines stability with low weight. However, the spider can have any reasonable number of legs. Another function of the retaining spider can be to provide variations in the weights of the different caps. We do this by using spiders of different weights under the different caps. The purpose is to compensate for differences in pressure drop across different bubble caps. Thus, the liquid level is higher on the liquid inlet side of a bubble tray than on the outlet side. Consequently, if all of the vertically displaceable bubble caps across the tray are identical in weight the vapor can escape more easily on the outlet side of the tray where the liquid head is less. There will then be a tendency for vapor to flow through only one side of the tray and the tray will function inefficiently.

To avoid this with our apparatus the spiders can be graded in weight with heavier weights being used on the outlet side of the tray so that each bubble cap will require the same vapor velocity to raise it. Similarly, the weights of the spiders on different trays can be varied if desired, since there is a variation in the pressure drop across the different trays from the bottom to the top of the tower.

Obviously many modifications and variations of the invention as hereinbefore set forth may be made without departing from the spirit and scope thereof and therefore only such limitations should be imposed as are indicated in the appended claim.

We claim:

A vapor-liquid contacting apparatus comprising a horizontal tray having a plurality of rows of vertically displaceable, disc-like caps disposed thereon, each of said caps being mounted over a large number of uniformly spaced, radially disposed, elongated openings in the tray floor, the rim of each cap being adapted to rest on the tray floor entirely surrounding the openings covered by said cap to form a seal against the flow of liquid into said openings, and means attached to the under surface of said cap for stabilizing said cap against tilting and limiting its vertical and horizontal displacement, said means being substantially entirely below said cap and comprising a plurality of elongated vertical legs passing downwardly through openings in the tray covered by said cap, said legs being uniformly spaced apart radially in attachment to said cap and having at their lower ends lateral members spaced apart vertically from the under surface of said tray when the rim of said cap rests on said tray, said lateral members being adapted to limit vertical displacement of said cap, the surface of said tray being substantially unobstructed by structure other than said caps and said caps being unrestricted in movement by structure other than said means comprising said elongated vertical legs and lateral members.

References Cited in the file of this patent

UNITED STATES PATENTS

| | | |
|---|---|---|
| 1,057,576 | Mussell | Apr. 1, 1913 |
| 1,453,735 | Twining | May 1, 1923 |
| 2,061,830 | Campbell | Nov. 24, 1936 |
| 2,525,064 | Bragg | Oct. 10, 1950 |
| 2,658,737 | Nutter | Nov. 10, 1953 |

FOREIGN PATENTS

| | | |
|---|---|---|
| 619,029 | France | Dec. 23, 1926 |